United States Patent
Sip

(10) Patent No.: US 8,381,234 B2
(45) Date of Patent: Feb. 19, 2013

(54) SYSTEM AND METHOD FOR MANAGING APPLICATIONS HAVING LOGICAL POINTER AND FLAG

(75) Inventor: Kim-Yeung Sip, Shenzhen (HK)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1109 days.

(21) Appl. No.: 12/249,878

(22) Filed: Oct. 10, 2008

(65) Prior Publication Data
US 2010/0010644 A1  Jan. 14, 2010

(30) Foreign Application Priority Data

Jul. 10, 2008 (CN) .......................... 2008 1 0302678

(51) Int. Cl.
*G06F 3/00* (2006.01)
*G06F 9/46* (2006.01)
*G06F 1/24* (2006.01)
*G06F 1/00* (2006.01)
*G06F 1/04* (2006.01)

(52) U.S. Cl. ........ 719/320; 718/100; 713/100; 713/501; 713/502

(58) Field of Classification Search .................. None
See application file for complete search history.

(56) References Cited

U.S. PATENT DOCUMENTS

| | | | | |
|---|---|---|---|---|
| 6,292,869 | B1 * | 9/2001 | Gerchman et al. | 711/106 |
| 2008/0243968 | A1 * | 10/2008 | Schmelter et al. | 707/206 |
| 2008/0281885 | A1 * | 11/2008 | Dussud | 707/206 |
| 2009/0259702 | A1 * | 10/2009 | Stephens et al. | 707/206 |

FOREIGN PATENT DOCUMENTS

| | | |
|---|---|---|
| JP | 2004527806 A | 9/2004 |
| JP | 2006202028 A | 8/2006 |
| JP | 2007102688 A | 4/2007 |
| JP | 2008129794 A | 6/2008 |

* cited by examiner

*Primary Examiner* — Charles E Anya
*Assistant Examiner* — Craig Dorais
(74) *Attorney, Agent, or Firm* — Altis Law Group, Inc.

(57) ABSTRACT

A system for managing a application includes a clock unit outputting time signals, a storage unit storing an age table, a detection unit and a resetting unit. The application includes a logical pointer and a flag carrying a flag bit. The age table includes ordered logical headers and age values, each logical header associated with an age value, the logical pointer pointing to one logical header, the age value having an increment as the logical pointer moves forward along the logical headers. The detection unit receives the time signals and reads the flag bit and moves the logical pointer to a succeeding logical header with a first step if the flag bit changes and with a second step if the flag bit remains unchanged during interval between two time signals. The second step is larger than the first step. The resetting unit resets the flag bit.

5 Claims, 2 Drawing Sheets

, $O_j$ is an increasing collection. All logical pointers of the applications $P_1, P_2, \ldots, P_i$ initially point to the logical header $PT_1$. That is, initial aging values of all the applications $P_1, P_2, \ldots, P_i$ are set as the aging value $O_1$, as shown in Table 1.

SYSTEM AND METHOD FOR MANAGING APPLICATIONS HAVING LOGICAL POINTER AND FLAG

BACKGROUND

1. Technical Field

The disclosure relates to application management, and particularly, to a system and a method for managing applications.

2. Description of the Related Art

In an intelligent robot system, numerous applications are designed to give the robot physiological functions, such as walking, running, and talking. As robotic technology progresses, more functionality/applications are added to the original system, previous functionality/applications may be redundant because they may never be used and thus add bulk to the operating software and may even slow down the robot system. As a result, manual deletion and/or management of the applications are required, which is inconvenient.

What is needed, therefore, is to provide a system and a method for managing applications.

DETAILED DESCRIPTION OF THE EMBODIMENTS

All of the processes described below may be embodied in, and fully automated via, software code modules executed by one or more general purpose computers or processors 100. The code modules may be stored in any type of computer-readable medium or other computer storage device. Some or all of the methods may alternatively be embodied in specialized computer hardware.

Figure 1:
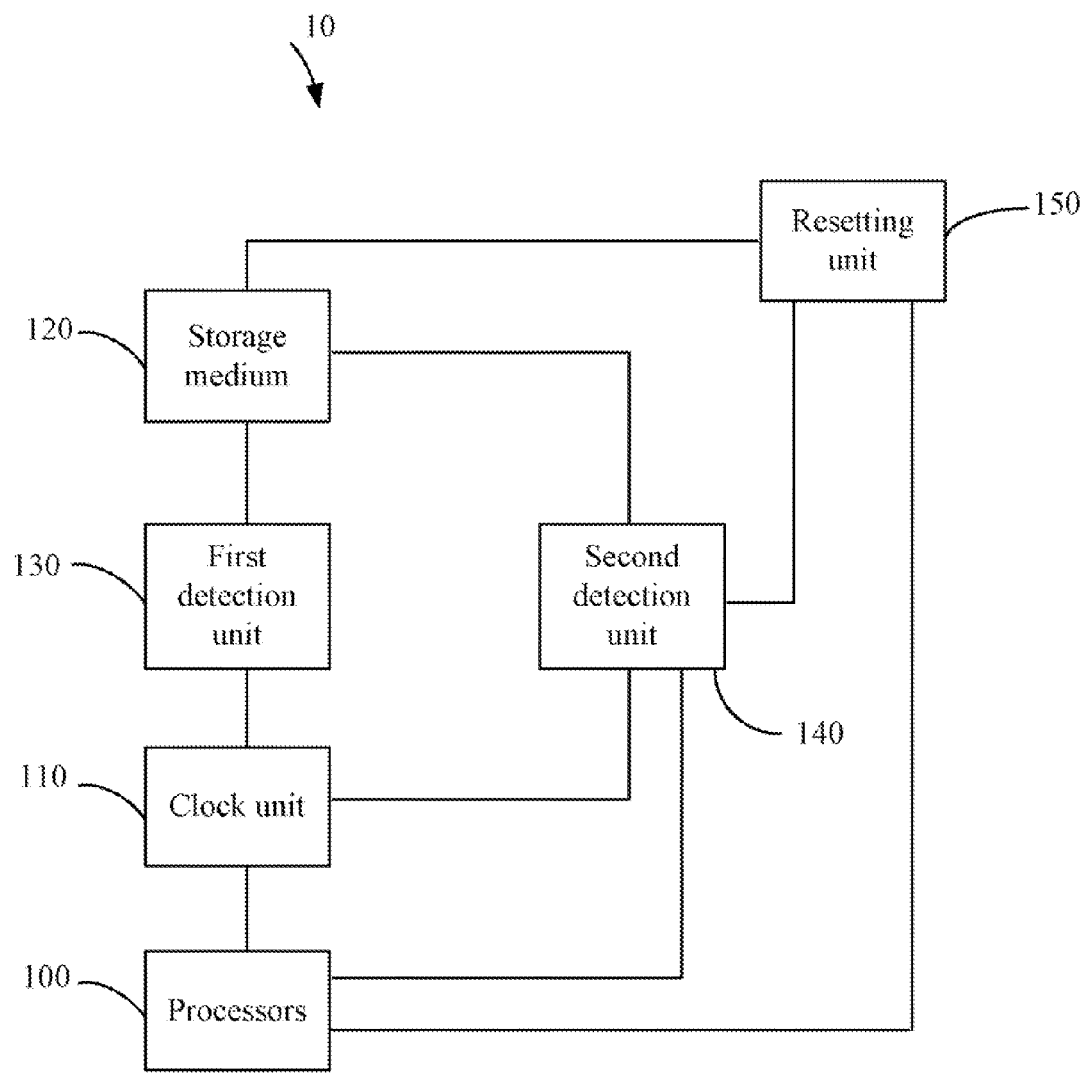
FIG. 1 is a functional blocks diagram of a system for managing applications according to an exemplary embodiment.

Referring to FIG. 1, a system 10 for managing applications further includes a clock unit 110, a storage medium 120, a first detection unit 130, a second detection unit 140, and a resetting unit 150.

The clock unit 110 is operable by the one or more processors 100 for outputting a number of sequential predetermined time signals. The time interval between two sequential time signals can be a fixed value or may be changeable during use. The clock unit 110 can be a reference clock of a device (e.g., a robot) where the system is used.

The storage medium 120 stores a number of applications $P_i$ and an age table (see Table 1). Each application $P_i$ includes a logical pointer and a flag $F_i$, where i and j are natural numbers. The flag $F_i$ is configured for carrying a flag bit indicative of the executable status of the corresponding application. For example, if the flag bit of flag $F_i$ is '0', it indicates that the corresponding application $P_i$ has never been executed. If the flag bit of flag $F_i$ is '1', it indicates that the corresponding application $P_i$ has been executed. All flag bits are initially set to '0'. The age table includes a collection of logical headers $PT_1, PT_2, \ldots, PT_j$ and a collection of aging values $O_1, O_2, \ldots, O_j$, wherein each logical header $PT_j$ is associated with an aging value $O_j$. The aging value represents the age of the application $P_i$. The greater the aging value $O_j$ is, the older the application $P_i$ will be.

In Table 1, the collection of the logical headers $PT_1, PT_2, \ldots, PT_j$ is an increasing collection, and correspondingly,

TABLE 1

| Logical Header | Aging Value |
| --- | --- |
| $PT_1$ | $O_1$ |
| $PT_2$ | $O_2$ |
| $PT_3$ | $O_3$ |
| … | … |
| $PT_j$ | $O_j$ |

The first detection unit 130 is operable by the one or more processors 100 for receiving the predetermined time signals at a first frequency and reading the flag bit of the flag to check which flag bit has changed into '1'. Applications with a changed flag bit '1' are considered to be executed applications during two received sequential time signals, and consequently, the logical pointers thereof are moved by the first detection unit 130 to a succeeding header with a first predetermined step, e.g., to the logical header $PT_2$ with one step. The aging values corresponding to these executed applications are changed to a succeeding aging value, e.g., the aging value $O_2$.

The second detection unit 140 is operable by the one or more processors 100 for receiving the predetermined time signals at a second frequency and reading the flag bit of the flag to check which flag bits remain unchanged, wherein the second frequency is no greater than the first frequency. The detection principle of the second detection unit 140 is substantially the same as that of the first detection unit 130. The difference is that the logical pointers of all unexecuted applications that have been detected are moved by the second detection unit 140 to a succeeding header with a second predetermined step, where the second predetermined step is larger than the first predetermined step. As a result, the unexecuted applications during two received sequential time signals, by the second detection unit 140, age faster than those that have been executed.

The resetting unit 150 is operable by the one or more processors 100 for resetting the flag bits of the applications $P_i$ after all flag bits of the applications $P_i$ are read.

The second detection unit 140 is further operable by the one or more processors 100 for detecting whether the aging values associated with the logical headers pointed to by the logical pointers of the applications are greater than a predetermined aging value after movement of the logical pointers of the applications, and configured for deleting the applications when the aging values are greater than the predetermined aging value. Therefore, applications that are unused are purged.

Following are examples for a better understanding of the above mentioned system.

An age table used in the examples is shown as Table 2. The number of applications installed in the device where the system 10 is used is three, represented as application $P_1$, application $P_2$, and application $P_3$. The predetermined aging value is set to 60. The first frequency is one every two days, while the second frequency is one every four days. Initially, the logical pointers of the applications $P_1, P_2, P_3$ are pointed to the logical header $PT_1$, which indicates the initial age of the applications $P_1, P_2, P_3$ is 10, as shown in Table 2.

TABLE 2

| Logical Header | Aging Value |
|---|---|
| $PT_1$ | 10 |
| $PT_2$ | 20 |
| $PT_3$ | 30 |
| $PT_4$ | 40 |
| $PT_5$ | 50 |
| $PT_6$ | 60 |
| $PT_7$ | 70 |

The first detection unit 130 operable by the one or more processors 100 receives the predetermined time signal every two days and reads the flag bit of each flag. In this example, the flag bit of a flag $F_1$ of the application $P_1$ is changed to '1' during two received sequential predetermined time signals. Therefore, the first detection unit 130 operable by the one or more processors 100 moves the logical pointer of the application $P_1$ to a succeeding logical header $PT_2$ with one step. Subsequently, the age of the application $P_1$ is changed from 10 to 20.

The second detection unit 140 operable by the one or more processors 100 receives the predetermined time signal every four days and reads the flag bit of each flag. In this example, the flag bits of flags $F_2$, $F_3$ of applications $P_2$, $P_3$ is "0". Therefore, the second detection unit 140 operable by the one or more processors 100 moves the logical pointers of the applications $P_2$, $P_3$ to a succeeding logical header $PT_3$ with two steps. Subsequently, the age of the applications $P_2$, $P_3$ is changed from 10 to 30. After the movement of the logical pointers of the applications $P_1$, $P_2$, $P_3$, the second detection unit 140 further operable by the one or more processors 100 detects whether the aging values associated with the logical headers pointed to by the logical pointers of the applications $P_1$, $P_2$, $P_3$ are greater than 60. If so, the applications with an age greater than 60 are deleted by the second detection unit 140.

After all flag bits are read, the resetting unit 150 operable by the one or more processors 100 resets the flag bits of flags $F_1$, $F_2$, $F_3$ of the applications $P_1$, $P_2$, $P_3$ to '0'.

In other embodiments, the storage unit may store an application or the system may include a detection unit operable by the one or more processors 100 for receiving the predetermined time signals and reading the flag bit of the flag at predetermined time signals and moving the logical pointer to a succeeding logical header with a first predetermined step if the flag bit changes and moving the logical pointer to a different logical header with a second predetermined step if the flag bit remains "0" during the interval between two predetermined time signals, where the second predetermined step is larger than the first predetermined step.

Figure 2:
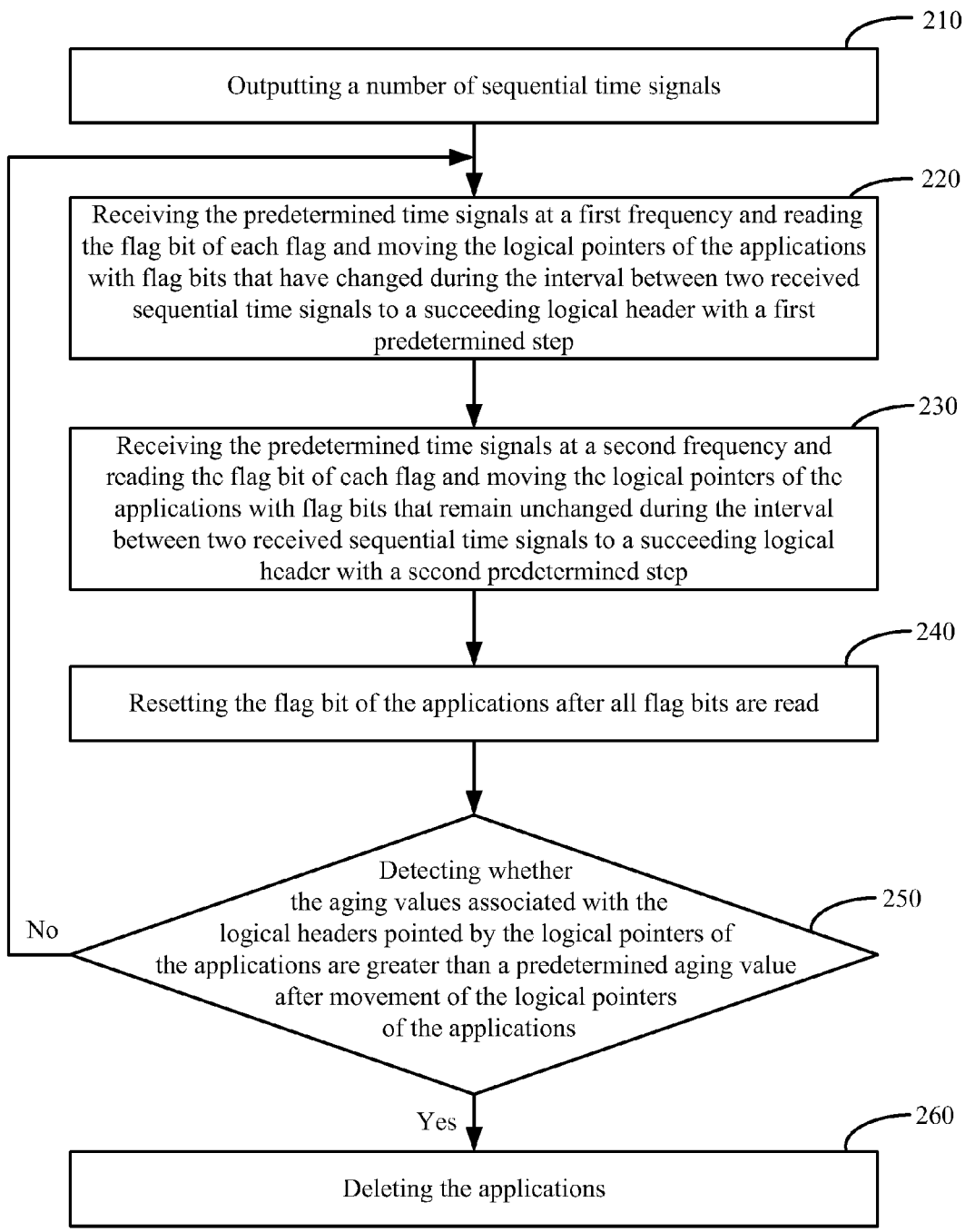
FIG. 2 is a flowchart of a method for managing applications.

Referring to FIG. 2, a method for managing applications includes step 210 through step 260. Step 210: outputting a number of sequential time signals via the one or more processors 100. Step 220: receiving the predetermined time signals at a first frequency and reading the flag bit of each flag and moving the logical pointers of the applications with flag bits that have changed during the interval between two received sequential time signals to a succeeding logical header with a first predetermined step via the one or more processors 100. Step 230: receiving the predetermined time signals at a second frequency and reading the flag bit of each flag and moving the logical pointers of the applications with flag bits that remain unchanged during the interval between two received sequential time signals to a succeeding logical header with a second predetermined step via the one or more processors 100. The second predetermined step is larger than the first predetermined step and the second frequency is no greater than the first frequency. Step 240: resetting the flag bit of the applications after all flag bits are read via the one or more processors 100. Step 250: detecting whether the aging values associated with the logical headers pointed to by the logical pointers of the applications are greater than a predetermined aging value after movement of the logical pointers of the applications via the one or more processors 100. Step 260: deleting the applications when the aging values are greater than the predetermined aging value via the one or more processors 100.

In summary, the system and method can move logical pointers of applications when the applications have been unexecuted during two received sequential time signals with a step longer than that with which the applications have been executed during two received sequential time signals. As a result, the unused applications during two received sequential time signals age faster than those that have been used. Furthermore, when the aging values of the applications are greater than a predetermined aging value, the system can delete the applications. Therefore, applications that are unused may be discarded.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system for managing a plurality of applications, each application comprising a logical pointer and a flag, the flag being configured for carrying a flag bit indicative of an executable status of the application, the system comprising:
   one or more processors;
   a clock unit operable by the one or more processors for outputting a plurality of sequential predetermined time signals;
   a storage medium storing an age table, the table comprising a collection of logical headers and a collection of aging values, wherein each logical header is associated with an aging value, the logical pointer pointing to one of the logical headers, the age value having a predetermined increment as the logical pointer moves forward along the ordered logical headers;
   a first detection unit operable by the one or more processors for receiving the predetermined time signals at a first frequency and reading the flag bit of each flag and moving the logical pointers of the applications with flag bits that have changed during the interval between two received sequential time signals to a succeeding logical header with a first predetermined step;
   a second detection unit operable by the one or more processors for receiving the predetermined time signals at a second frequency and reading the flag bit of each flag and moving the logical pointers of the applications with flag bits that have remained unchanged during the interval between two received sequential time signals to a succeeding logical header with a second predetermined step, wherein the second predetermined step is larger than the first predetermined step and the second frequency is no greater than the first frequency;
   a resetting unit operable by the one or more processors for resetting the flag bit of the applications after all flag bits are read.

2. The system as claimed in claim 1, wherein the second detection unit is further operable by the one or more processors for detecting whether the aging values associated with the logical headers pointed to by the logical pointers of the applications are greater than a predetermined aging value after movement of the logical pointers of the applications, and operable by the one or more processors for deleting the applications when the aging values are greater than the predetermined aging value.

3. A method of managing applications installed into a system, the system comprising one or more processors and a storage medium storing an age table, each application comprising a logical pointer and a flag, the flag being configured for carrying a flag bit indicative of an executable status of the application, the table comprising a collection of logical headers and a collection of aging values, wherein each logical header is associated with an aging value, the logical pointer pointing to one of the logical headers, the age value having a predetermined increment as the logical pointer moves forward along the ordered logical headers, the method comprises:
  outputting a plurality of sequential predetermined time signals via the one or more processors;
  receiving the predetermined time signals at a first frequency and reading the flag bit of each flag and moving the logical pointers of the applications with flag bits that have changed during the interval between two received sequential time signals to a succeeding logical header with a first predetermined step via the one or more processors;
  receiving the predetermined time signals at a second frequency and reading the flag bit of each flag and moving the logical pointers of the applications with flag bits that have remained unchanged during the interval between two received sequential time signals to a succeeding logical header with a second predetermined step via the one or more processors, wherein the second predetermined step is larger than the first predetermined step and the second frequency is no greater than the first frequency; and
  resetting the flag bits of the applications after all flag bits are read via the one or more processors.

4. The method as claimed in claim 3, further comprising:
  detecting whether the aging values associated with the logical headers pointed to by the logical pointers of the applications are greater than a predetermined aging value after movement of the logical pointers of the applications via the one or more processors, and;
  deleting the applications when the aging values are greater than the predetermined aging value via the one or more processors.

5. A system for managing an application, the application comprising a logical pointer and a flag, the flag being configured for carrying a flag bit indicative of an executable status of the application, the system comprising:
  one or more processors;
  a clock unit operable by the one or more processors for outputting a plurality of subsequent predetermined time signals;
  a storage unit storing an age table, the age table comprising a collection of ordered logical headers and a collection of age values, where each logical header is associated with an age value, the logical pointer pointing to one of the logical headers, the age value having a predetermined increment as the logical pointer moves forward along the ordered logical headers;
  a detection unit operable by the one or more processors for receiving the predetermined time signals and reading the flag bit of the flag and moving the logical pointer to a succeeding logical header with a first predetermined step if the flag bit changes and with a second predetermined step if the flag bit remains unchanged during the interval between two predetermined time signals, where the second predetermined step is larger than the first predetermined step; and
  a resetting unit operable by the one or more processors for frequently resetting the flag bit after reading the flag bit of the flag.

* * * * *